United States Patent [19]

Hamanaka et al.

[11] Patent Number: 4,772,580

[45] Date of Patent: Sep. 20, 1988

[54] CATALYST CARRIER OF CORDIERITE HONEYCOMB STRUCTURE AND METHOD OF PRODUCING THE SAME

[75] Inventors: Toshiyuki Hamanaka, Suzuka; Keiichiro Watanabe; Takashi Harada, both of Nagoya; Seiichi Asami, Okazaki, all of Japan

[73] Assignee: NGK Insulators, Ltd., Nagoya City, Japan

[21] Appl. No.: 936,501

[22] Filed: Dec. 1, 1986

[30] Foreign Application Priority Data

Dec. 27, 1985 [JP] Japan .................................. 60-293692
Aug. 5, 1986 [JP] Japan .................................. 61-183904

[51] Int. Cl.$^4$ .............................................. B01J 32/00
[52] U.S. Cl. .................................... 502/439; 502/527; 428/116
[58] Field of Search ................. 502/439, 527; 428/116

[56] References Cited

U.S. PATENT DOCUMENTS

| | | |
|---|---|---|
| 3,790,654 | 5/1975 | Bagley ................................ 264/177 |
| 3,885,977 | 5/1975 | Lachman et al. ...................... 501/80 |
| 3,954,672 | 5/1976 | Somers et al. .................. 502/527 X |
| 3,958,058 | 5/1976 | Elmer ................................ 428/220 |
| 4,253,992 | 3/1981 | Soejima et al. ................ 502/527 X |
| 4,280,845 | 7/1981 | Matsuhisa et al. .................... 501/43 |
| 4,293,514 | 10/1981 | Wada .................................... 264/61 |
| 4,295,892 | 10/1981 | Matsuhisa et al. .................. 501/120 |
| 4,297,140 | 10/1981 | Paisley .............................. 428/310 |
| 4,416,675 | 11/1983 | Montierth .......................... 55/502 |

*Primary Examiner*—W. J. Shine
*Attorney, Agent, or Firm*—Parkhurst & Oliff

[57] ABSTRACT

Catalyst carriers made of cordierite honeycomb structures having low thermal expansion, porosities of not exceeding 30%, high strengths and thin partition walls with high cell density or low cell density are provided by using very fine particles of kaoline and talc which are considered heretofore disadvantageous for producing such catalyst carriers. The catalyst carriers are useful in a broader use field than conventional ones, particularly as catalyst carriers for purifying exhaust gases exited from automobile engines.

19 Claims, 3 Drawing Sheets

FIG. 1

FIG_2

FIG_3

FIG_4

CATALYST CARRIER OF CORDIERITE HONEYCOMB STRUCTURE AND METHOD OF PRODUCING THE SAME

BACKGROUND OF THE INVENTION

1. Field of the Invention

The present invention relates to a catalyst carrier of cordierite honeycomb structure, particularly to a catalyst carrier of high strength and low thermal expansion honeycomb structure used for catalyst carriers for purifying exhaust gases from automobiles, and a method of producing the carrier.

2. Related Art Statement

Recently, thermal shock resistant and porous cordierite honeycomb ceramics have been investigated, especially as materials for catalyst carriers made of honeycomb structures used in devices for purifying hydrocarbons, carbon monoxide and nitrogen oxides in various exhaust gases. Among various devices for purifying exhaust gases, devices for purifying exhaust gases from automobiles are prevailingly used at the present time. Catalyst carriers used in such purifying devices for exhaust gases from automobile engines should possess a few important characteristic properties. One of such properties is a so-called "thermal shock resistance" which is a property of a material to withstand a crack or breakage caused by a thermal stress exerted by temperature differences. The temperature differences are formed in a honeycomb structure by temperature changes due to rapid heat generation by catalytic oxidation reactions of unburnt hydrocarbons, carbon monoxide, or the like in an exhaust gas. The thermal shock resistance is expressed by a temperature difference of the honeycomb structure of withstanding a rapid heating and a rapid cooling, and the temperature difference is known to be inversely proportional to a coefficient to thermal expansion among various properties of the honeycomb structure, and thermal shock resistance becomes larger when the coefficient of thermal expansion (to be referred to as "CTE" hereinafter) becomes smaller.

Another property that catalyst carriers made of a ceramic honeycomb structure should possess is an adhering property of catalyst active substances and catalyst substances to the catalyst carriers.

An additional important property requested to catalyst carriers made of ceramic honeycomb structure is initial activity (the right-off property) of the catalyst at the incipient period of using the catalyst made of honeycomb structure.

Heretofore, low expansion of cordierite ceramics has been publicly known. For instance, U.S. Pat. No. 3,885,977 specification discloses an oriented cordierite ceramics of CTE of less than $11 \times 10^{-7} (1/°C.)$ in at least one direction in a temperature range of 25°–1,000° C., and describes a planar orientation determinated into platelets during processing of stacked clay, which can be platelet clay such as kaoline, or the like as a cause of such orientation.

In addition, U.S. Pat. No. 4,280,845 discloses use of a magnesia source material such as talc, etc. of a limited coarse particles range of 10–50 $\mu$m to obtain extremely low thermal expansion cordierite ceramics.

Meanwhile, according to recent extensive improvement in the technique of applying catalysts on carriers of honeycomb structure, a desire for highly porous catalyst carriers of honeycomb structure has been decreased. On the other hand, reduction of volume of the catalyst carriers, improvement of the catalyst property, improvement of right-off property and reduction of fuel consumption rate; reduction of pressure loss for increasing engine power; improvement of strength for reducing cost of canning the honeycomb structure in a casing; and improvements of strength and thermal shock resistance from the necessity of arranging the catalyst-equipped devices for purifying exhaust gases near the automobile engines as near as possible for enhancing the catalyst activity; have been earnestly desired. For solving these recent desires of the catalyst carriers of honeycomb structure, thinning of the partition walls of the cells of the honeycomb structure and increase of cell number per unit crosssectional area of the honeycomb structure for improving the catalyst properties, or thinning of the partition walls and decrease of cells number per unit area for decreasing pressure loss, have been studied. However, the thinning of the partition walls and the increase of cell number lead to a drawback of decreasing the strength of the porous cordierite ceramics of honeycomb structure, and a drawback of largely increasing the CTE of the cordierite honeycomb structure, because of a necessity of using far finer particles as raw materials, particularly magnesia source material, caused by decrease of width of slits of an extruding die which extrudes the raw materials into a honeycomb structure.

Densification of cordierite ceramics is rather difficult. Especially, for producing low thermal expansion cordierite ceramics of CTE of $2.0 \times 10^{-6}/°C.$ or less in a temperature range of from room temperature to 800° C., batch composition of raw materials have to be used wherein an amount of impurities such as alkali (calcia, potassium, sodium) and the like which function as fluxes in firing the batch is limited to a very minor amount, so that cordierite honeycomb structures obtained by firing the batch composition have very low amounts of glass phases and hence are very porous and not dense. Particularly, cordierite honeycomb structures recently used as carriers of catalysts for purifying exhaust gases from automobiles necessitate CTE not greater than $1.5 \times 10^{-6}/°C.$ in a temperature range of room temperature to 800° C., so that raw materials such as talc, kaoline, alumina, etc. of low impurities are predominantly used, and hence the fired cordierite honeycomb bodies have open porosities of about 25–45%, even if production criteria, types and particle sizes of the raw materials are selected cautiously. Especially, for producing honeycomb structures having porosities of not greater than 30%, amounts of the impurities and minimization of particle sizes of the raw materials are unavoidable, so that product honeycomb structures of CTE of $1.0 \times 10^{-6}/°C.$ or less in a temperature range of from room temperature to 800° C. have not been obtained.

Moreover, when producing cordierite honeycomb structures of relatively small porosity, molded honeycomb structures have such a large shrinkage in the drying step and the firing step of the production process that they are liable to suffer from cracks, and honeycomb structures of large sizes have been difficult to produce at high production yields.

From the technical reasons as described above, catalyst carriers of very low thermal expansion cordierite honeycomb structures and low porosity and still of sufficiently high strength properties, have been earnestly desired.

SUMMARY OF THE INVENTION

It is an object of the present invention to provide the above desired cordierite honeycomb structures of superior properties having very low thermal expansion, thin walls, a large number of cells, and high strength properties.

Other objects of the present invention will become apparent from the ensuing descriptions of the specification.

If fine talc is used as a raw material for batches of raw materials for producing honeycomb structures, the produced honeycomb structures have the drawback of an extremely large CTE, as described in the aforementioned U.S. Pat. No. 4,280,845.

The inventors have used the fine talc particles which have the drawback as mentioned above, especially fine talc particles of an average particles diameter of 7 $\mu$m or less, preferably 5 $\mu$m or less, and have discovered that increase of CTE caused by the use of the very fine talc particles can be obviated by co-use of very fine kaoline particles of an average particle diameter of 2 $\mu$m or less, preferably 1 $\mu$m or less, which finding lead to the present invention.

The fine raw materials including the co-use of very fine talc and kaoline can further include co-use of fine alumina and/or aluminum hydroxide of an average particle diameter of 2 $\mu$m or less and/or highly pure amorphous silica.

The inventors have also discovered that the co-use of the very fine raw materials can decrease the porosity of the produced cordierite honeycomb structures of 30% or less, and exhibit a high strength which can assuredly withstand practical uses of the produced cordierite honeycomb structures, even when the partition walls of the cells of the honeycomb structures are produced thinly.

The inventors have further discovered that use of kaoline of an average particle diameter of one-third ($\frac{1}{3}$) or less of an average particle diameter of talc, is preferable.

The inventors have also discovered that a difference is very small between CTE in the vertical direction to the flow passages (to be referred to as "axis B", hereinafter) of the honeycomb structure, which CTE in axis B has great contribution to the thermal shock resistant property of the honeycomb structure, and CTE in the direction of flow passages (to be referred to as "axis A", hereinafter) of the honeycomb structure, which CTE in axis A possess a lower thermal property due to orientations of cordierite crystals.

Conventional cordierite honeycomb structures using coarse particles of the raw materials have random orientations of the raw materials such as talc, kaoline, etc. at about the crosssections of the ribs of the honeycomb structures when the honeycomb structures are formed by extrusion from extrusion dies, so that CTE in axis B have showed large values of CTEs' difference of exceeding $0.2 \times 10^{-6}/°C.$ in a temperatures range of 40°-800° C. as compared with CTE in axis A.

Additionally, the inventors have discovered that the honeycomb structures are adversely influenced only in a small extent on thermal expansion at the crosssections of the partition walls of the honeycomb structures by virtue of the use of the very fine particles of the raw materials, and the thermal expansion in axis B of the honeycomb structures can be decreased extensively which is very important in improving the thermal shock resistance of the honeycomb structures.

The present invention is a catalyst carrier of cordierite honeycomb structure of high strength and low thermal expansion, which has a chemical composition in weight basis of 42–56% of $SiO_2$, 30–45% of $Al_2O_3$ and 12–16% of MgO as main components, crystal phases consisting mainly of cordierite, a porosity of 30% or less, preferably 25% or less, CTE of $0.8 \times 10^{-6}/°C.$ or less in axis A in a temperature range of 40°-800° C., and a CTE of $1.0 \times 10^{-6}/°C.$ or less in axis B in a temperature range of 40°-800° C.

In an embodiment of the present invention, the honeycomb structure has a partition wall thickness of 203 $\mu$m or less.

The present invention is also a method of producing a catalyst carrier of cordierite honeycomb structure, comprising, preparing a batch of very fine talc of an average particle diameter of 7 $\mu$m or less, very fine kaoline of an average particle diameter of 2 $\mu$m which is $\frac{1}{3}$ or less of the average particle diameter of talc and other raw materials for producing a cordierite honeycomb structure of a chemical composition in weight basis of 42–56% of $SiO_2$, 30–45% of $Al_2O_3$ and 12–16% of MgO as main components, adding an organic binder and a plasticizer to the batch, kneading the added batch to plasticize the same to an extrudable extent, extruding the admixture to form a honeycomb structure, drying the extruded honeycomb structure, and firing the honeycomb structure at a temperature of 1,350°-1,440° C., whereby a catalyst carrier of cordierite honeycomb structure of high strength and low thermal expansion is produced, which has a chemical composition in weight basis of 42–56% of $SiO_2$, 30–45% of $Al_2O_3$ and 12–16% of MgO as main components, crystal phases consisting mainly of cordierite, a porosity of 30% or less, CTE of $0.8 \times 10^{-6}/°C.$ or less in axis A in a temperature range of 40°-800° C., CTE of $1.0 \times 10^{-6}/°C.$ or less in axis B in a temperature range of 40°-800° C., and a difference of $0.2 \times 10^{-6}/°C.$ or less between the two CTE's.

In producing the cordierite honeycomb structures of the present invention, the raw materials can also include alumina and/or aluminum hydroxide of an average particle diameter of 2 $\mu$m or less and/or 8% or less of highly pure amorphous silica.

The honeycomb structure of the present invention has a chemical composition in weight basis of 42–56%, preferably 47–53% of $SiO_2$, 30–45%, preferably 32~38% of $Al_2O_3$, and 12–16%, preferably 12.5–15% of MgO, which is in a region extending around a theoretical composition point of cordierite ($2MgO.2Al_2O_3.5SiO_2$) known heretofore as a composition of low thermal expansion cordierite ceramics, and can achieve the purposes of a porosity of 30% or less, CTE of $0.8 \times 10^{-6}/°C.$ or less in axis A in a temperature range of 40°-800° C., and CTE of $1 \times 10^{-6}/°C.$ or less in axis B in the same temperature range, by varying various conditions for producing the cordierite honeycomb structure.

Chemical components other than the main components are liable to have adverse influences on the thermal expansion property of the cordierite honeycomb structures, so that the impurities such as $TiO_2$, CaO, $K_2O$, $Na_2O$, $Fe_2O_3$, $P_2O_5$, or the like are desirably suppressed to an amount of 2.5% or less. Particularly, the smaller the amount of alkali components such as CaO, $K_2O$ and $Na_2O$ is, the better the thermal expansion property of the honeycomb structures. The amount of $P_2O_5$ should be substantially zero of less than 0.1%.

The crystal phases preferably consist substantially of cordierite crystal phase, the amount of the cordierite crystals is at least 90 wt%, and the amounts of mullite and spinel (inclusive of sapphirine) as other crystals contained are respectively 2.5 wt% at the maximum. The fine talc particles are preferably of small impurities or alkali content, and preferably produced by a pulverizing or crushing means such as Raymond mill, etc., and not by a grinding means such as a ball mill, etc., which destructs the shape of the talc particles. The talc particles of diameters exceeding 7 μm cause the difference of the two CTE in axes A and B and the porosity to be large. Also, the fine kaoline particles preferably have a low impurity content, and preferably those of small variations in crystal shape and not intermingled with large crystals. For example, kaoline materials having large variations in crystal shape and a tendency of forming secondary particles, such as New Zealand kaoline, etc., are not preferable.

In preparing the raw material kaoline from calcined kaoline, the calcined kaoline is preferably ground in a wet type ball mill, in order to obtain dense honeycomb structures.

If kaoline of particle diameter of exceeding 2 μm is used simultaneously with talc particles of diameters of 7 μm or less, the cordierite honeycomb structures produced have increased CTE and porosities.

If the fine raw material talc of an average particle diameter of 5 μm or less and/or the fine raw material kaoline of an average particle diameter of 1 μm or less and which is ⅓ or less of the average particles diameter of talc are used, the porosity can be decreased, while maintaining the low expansion.

The present invention includes use of calcined talc and calcined kaoline which are effective for preventing the formation of cracks in the honeycomb structures caused by shrinkage, etc. during the drying and firing steps, when using the finely divided or pulverized raw materials kaoline and talc. Use of a higher temperature for calcining talc and kaoline results in increased porosity and CTE of the resultant honeycomb structures, so that the calcining temperature should preferably be made as low as possible, if calcined talc or kaoline is used. The splendid effects of the present invention cannot be attained, unless the same fine particles of calcined talc and kaoline as those of the raw materials talc and kaoline are used.

In order to achieve porosity of 30% or less, the other raw materials for cordierite, namely, an alumina source material such as alumina, aluminum hydroxide, etc., and a silica source material such as amorphous silica, quartz sand, etc., which are the same ones as those used conventionally can be used. However, the amount of impurities such as alkali in the chemical composition of the raw materials has to be properly adjusted and particle sizes of the raw materials have to be properly adjusted by excluding or cutting off the coarse particles, depending on thickness of the partition walls of the honeycomb structures to be produced.

When using the fine particles of alumina and/or aluminum hydroxide, for achieving a porosity of 25% or less, use of fine particles of a diameter of 2 μm or less contribute to the aimed decrease of porosity, and use of alumina of low sodium content ($Na_2O$ of 0.12% or less) affords further advantageous effects of low CTE and low porosity.

Addition of highly pure amorphous silica for achieving low thermal expansion also contributes to decrease of porosity. However, addition in excess of 8% is not preferable, because it deteriorates the catalyst carriers properties.

For producing the cordierite honeycomb structures, extrusion process used for the production of conventional cordierite honeycomb structures can be applied. In firing, the firing temperature is desirably elevated at an average temperature raising rate of 20°-300° C./hr, preferably 30°-200° C./hr, in a temperature range of 1100°-1350° C. to a maximum temperature of 1350°-1440° C. where it is held for 0.5-24 hrs. If the average temperature raising rate is less than 20° C./hr, the CTE becomes large, and if it exceeds 300° C./hr, deformation of the fired product becomes large. While, if the firing temperature is less than 1350° C., the CTE becomes large, and if it exceeds 1440° C., deformation of the fired product becomes large.

Regarding cell structure and strength properties, honeycomb structures particularly for use as catalyst carriers for purifying exhaust gases exited from automobile engines should have a compressive strength in axis A of at least 150-200 kg/cm$^2$ for a square cell structure of a cell number of 62 per square centimeters and a partition wall thickness of 152 μm (abbreviated as "152 μm/62 cells/cm$^2$", hereinafter) in order to withstand vibration in operation of automobiles as well as holding pressure of containers holding the catalyst carriers. According to the present invention, porosity can be decreased to 30% or less without increasing the CTE of the cordierite honeycomb structures, so that a high level of compression strength in axis A of 300 kg/cm$^2$ or more at 152 μm/62 cells/cm$^2$ can be achieved.

In addition, honeycomb structures of a cell structure of 152 μm/47 cells/cm$^2$ were so weak in strength that practical use thereof was impossible, and a cell structure of a cell number of 93 per cm$^2$ and a rib thickness of 102 μm (abbreviated as "102 μm/93 cells/cm$^2$") which were unable to use in practice from the both view points of strength and CTE, exhibit considerable level of compression strength in axis A of 200 kg/cm$^2$ or more, so that it became possible to design various cell structures depending on shape of the catalyst carrier and condition of places at which the catalyst carriers are to be arranged. That is, the improvement of the strength of the honeycomb structures brought from the present invention can exhibit superior effects in thermal shock resistant property and catalyst properties as compared with conventional ones in applying the present invention to the honeycomb structures of thinner partition walls and a higher number of cells, i.e., highly densified cells, and can exhibit excellent effects in improving thermal shock resistance and decreasing pressure loss as compared with conventional ones in applying the present invention to honeycomb structures of thin wall and low number of cells.

In contrast to heretofore use honeycomb structures of a partition wall thickness of 300 μm and a cell number of 47 per cm$^2$, the present invention can obtain honeycomb structures of a partition wall thickness of 102 μm and a cell number of 93 per cm$^2$, so that catalyst activity can be extensively improved owing to the cell structure of high density of cell number per unit area as well as thermal shock resistant property. Hence, cordierite honeycomb structures which are suited well as catalyst carriers for purifying exhaust gas from automobile engines can be realized for mounting on manifolds, etc., near automobile engines.

Similarly, as compared with a honeycomb structure of conventional 300 μm/47 cells/cm², the honeycomb structure of 152 μm/62 cells/cm² is widely improved in compression strength in axis A, so that canning of the honeycomb structure to a casing thereof can be simplified and honeycomb structures suited well to the mounting at manifolds, etc., near automobile engines of violent vibration can be achieved.

In addition, honeycomb structures of 152 μm/47 cells/cm² of CTE and compression strength in axis A which are the same level as those of honeycomb structures of 300 μm/47 cells/cm² can be obtained, so that honeycomb structures can be achieved which have improved engine powers due to decrease of pressure loss of exhaust gases from automobile engines and which are suited well to decrease the fuel consumption rate.

The low CTE in axis B of the honeycomb structures according to the present invention are advantageous, particularly in increasing the cell number per unit area to improve the catalyst carriers properties.

The honeycomb structures of the present invention provides an advantage that they are composed of cell structure of considerably thinner partition walls thickness as compared with conventional honeycomb structures of partition wall thickness of 203 μm or less. That is, the present invention is suitable for honeycomb structures of thin walls and relatively small number of cells per unit area. Meanwhile, the present invention can also be applied widely to honeycomb structures of large partition wall thickness and a small number of cells per unit area, by virtue of achieved high strength.

BRIEF DESCRIPTION OF THE DRAWINGS

For a better understanding of the present invention, reference is made to the accompanying drawings, in which.

DESCRIPTION OF THE PREFERRED EMBOIMENTS

Hereinafter, the present invention will be explained in more detail with reference to Examples.

EXAMPLE 1

Raw materials of chemical compositions and particle sizes as shown in the following Table 1 are mixed based on the recipes as shown in Table 2 to prepare batches of Nos. 1–32 of Table 2, wherein 100 parts by weight of each batch is added with 3.8 parts by weight of methylcellulose and a suitable amount of water to produce mixtures capable of being blended and extruded. The raw materials used are preliminarily passed through a sieve of 63 μm. Then, the mixtures are blended.

Thereafter, each mixture of the respective batch is formed by a publicly known extrusion means into a cylindrical honeycomb structure of a diameter of 93 mm and a height of 100 mm having a square cell structure, a partition wall thickness of 102 μm, and a cell number of 93 per cm². Each honeycomb structure is dried, and fired at a firing condition as shown in Table 2 to obtain sintered honeycomb structure bodies. The sintered bodies are evaluated on the CTE in axis A in a temperature range of 40°–800° C., the CTE in axis B in the same temperature range, porosity, amount of cordierite crystals, compression strength in the direction of axis A, and thermal shock resistance. The results of the evaluation are also shown in Table 2. All the sintered bodies have chemical compositions of $P_2O_5$ content of less than 0.1%.

Particle size distributions and average particles diameter of the raw materials are those based on the principle of X-ray sedimentation method, and measured by Sedigraph (Trade name) of Micromeritics Co.

TABLE 1(a)

| | Average particles diameter (μm) | Ig. loss | $SiO_2$ | $Al_2O_3$ | MgO | $TiO_2$ | $Fe_2O_3$ | CaO + $Na_2O$ + $K_2O$ |
|---|---|---|---|---|---|---|---|---|
| Talc (A) | 18.0 | 5.8 | 61.2 | 0.9 | 30.9 | — | 0.8 | 0.3 |
| Talc (B) | 10.5 | 5.7 | 60.9 | 1.2 | 30.8 | — | 0.9 | 0.3 |
| Talc (C) | 7.0 | 5.6 | 61.3 | 0.9 | 30.9 | — | 0.9 | 0.3 |
| Talc (D) | 4.5 | 5.7 | 60.8 | 1.3 | 30.8 | — | 1.0 | 0.3 |
| Talc (E) | 3.7 | 5.7 | 61.1 | 1.1 | 30.8 | — | 0.9 | 0.3 |
| Talc (F) | 5.0 | 5.7 | 61.6 | 0.9 | 30.5 | — | 0.8 | 0.3 |
| Calcined talc[*1] | 4.5 | 0.1 | 64.4 | 1.4 | 32.6 | — | 1.0 | 0.3 |
| Kaoline (A) | 5.9 | 13.9 | 45.6 | 38.7 | — | 0.8 | 0.3 | 0.2 |
| Kaoline (B) | 2.0 | 13.9 | 45.7 | 38.8 | — | 0.9 | 0.3 | 0.2 |
| Kaoline (C) | 1.0 | 13.9 | 45.5 | 38.6 | — | 1.0 | 0.4 | 0.2 |
| Kaoline (D) | 0.4 | 13.9 | 45.5 | 38.6 | — | 0.8 | 0.4 | 0.2 |
| Kaoline (E) | 0.2 | 13.9 | 45.2 | 37.9 | — | 1.4 | 0.8 | 0.2 |

TABLE 1(b)

| | Average particles diameter (μm) | Ig. loss | $SiO_2$ | $Al_2O_3$ | MgO | $TiO_2$ | $Fe_2O_3$ | CaO + $Na_2O$ + $K_2O$ |
|---|---|---|---|---|---|---|---|---|
| Calcined kaoline (A)[*2] | 1.0 | 0.1 | 53.1 | 45.0 | — | 0.9 | 0.4 | 0.2 |
| Calcined kaoline (B)[*3] | 2.0 | 0.1 | 53.1 | 45.1 | — | 0.8 | 0.4 | 0.2 |
| Calcined kaoline (C)[*4] | 5.9 | 0.1 | 53.2 | 45.0 | — | 0.8 | 0.4 | 0.2 |
| Alumina | 4.0 | 0.2 | — | 99.2 | — | — | — | 0.3 |
| Aluminum hydroxide | 1.2 | 33.7 | — | 64.5 | — | — | — | 0.3 |

TABLE 1(b)-continued

| | Average particles diameter (μm) | Ig. loss | SiO$_2$ | Al$_2$O$_3$ | MgO | TiO$_2$ | Fe$_2$O$_3$ | CaO + Na$_2$O + K$_2$O |
|---|---|---|---|---|---|---|---|---|
| Silica | 9.1 | 0.3 | 99.4 | 0.1 | — | — | 0.1 | — |

*[1] Prepared by firing talc (D) at 1000° C. for 2 hours
*[2] Prepared by firing kaoline (C) at 1000° C. for 4 hours
*[3] Prepared by firing kaoline (B) at 1000° C. for 4 hours
*[4] Prepared by firing kaoline (A) at 1000° C. for 4 hours TABLE 2(a)-1

| | Batch composition (wt %) | | | | | | | Ratio of average particle size (kaoline/talc) | Firing | | |
|---|---|---|---|---|---|---|---|---|---|---|---|
| Test No. | Talc (average particle size μm) | Calcined talc | Kaoline (average particle size μm) | Calcined kaoline (average particle size μm) | Alumina | Aluminum hydroxide | Silica | | Temperature raising rate*[1] (°C./hr) | Maximum temperature (°C.) | Holding time (hr) |
| 1 | 41.0 (18) | — | 25.0 (0.4) | 20.5 (1.0) | 13.5 | — | — | 1/27 | 60 | 1420 | 4 |
| 2 | 41.0 (10.5) | — | 25.0 (0.4) | 20.5 (1.0) | 13.5 | — | — | 1/16 | 60 | 1420 | 4 |
| 3 | 41.0 (7.0) | — | 25.0 (0.4) | 20.5 (1.0) | 13.5 | — | — | 1/10 | 60 | 1420 | 4 |
| 4 | 41.0 (4.5) | — | 25.0 (0.4) | 20.5 (1.0) | 13.5 | — | — | 1/6.7 | 60 | 1420 | 4 |
| 5 | 41.0 (3.7) | — | 25.0 (0.4) | 20.5 (1.0) | 13.5 | — | — | 1/5.5 | 60 | 1420 | 4 |
| 6 | 41.0 (4.5) | — | 25.0 (0.2) | 20.5 (1.0) | 13.5 | — | — | 1/8.0 | 80 | 1415 | 8 |
| 7 | 41.0 (3.7) | — | 25.0 (0.2) | 20.5 (1.0) | 13.5 | — | — | 1/6.6 | 80 | 1415 | 8 |
| 8 | 41.0 (4.5) | — | 25.0 (5.9) | 20.5 (5.9) | 13.5 | — | — | 1/0.8 | 50 | 1425 | 6 |
| 9 | 41.0 (7.0) | — | 25.0 (2.0) | 20.5 (1.0) | 13.5 | — | — | 1/4.5 | 50 | 1425 | 6 |
| 10 | 41.0 (4.5) | — | 25.0 (1.0) | 20.5 (1.0) | 13.5 | — | — | 1/4.5 | 50 | 1425 | 6 |
| 11 | 39.0 (4.5) | — | 20.0 (5.9) | 15.0 (5.9) | 10.5 | 10.5 | 5.0 | 1/0.8 | 50 | 1425 | 6 |
| 12 | 39.0 (4.5) | — | 20.0 (0.4) | 15.0 (1.0) | 10.5 | 10.5 | 5.0 | 1/6.8 | 50 | 1425 | 6 |
| 13 | 30.5 (3.7) | 10.0 | 21.7 (0.2) | 23.3 (1.0) | 14.5 | — | — | 1/6.3 | 80 | 1410 | 6 |

TABLE 2(a)-2

| | Batch composition (wt %) | | | | | | | Ratio of average particle size (kaoline/talc) | Firing | | |
|---|---|---|---|---|---|---|---|---|---|---|---|
| Test No. | Talc (average particle size μm) | Calcined talc | Kaoline (average particle size μm) | Calcined kaoline (average particle size μm) | Alumina | Aluminum hydroxide | Silica | | Temperature raising rate*[1] (°C./hr) | Maximum temperature (°C.) | Holding time (hr) |
| 14 | 24.2 (4.5) | 15.0 | 20.8 (5.9) | 25.1 (5.9) | 14.9 | — | — | 1/0.8 | 80 | 1410 | 6 |
| 15 | 24.2 (3.7) | 15.0 | 20.8 (0.2) | 23.1 (1.0) | 14.9 | — | — | 1/6.3 | 80 | 1410 | 6 |
| 16 | 40.5 (3.7) | — | 20.0 (0.2) | 25.8 (1.0) | 13.7 | — | — | 1/5.7 | 30 | 1410 | 6 |
| 17 | 40.5 (3.7) | — | 20.0 (0.2) | 25.8 (1.0) | 13.7 | — | — | 1/5.7 | 80 | 1410 | 6 |
| 18 | 40.5 (3.7) | — | 20.0 (0.2) | 25.8 (1.0) | 13.7 | — | — | 1/5.7 | 120 | 1410 | 6 |
| 19 | 40.5 (4.5) | — | 20.0 (0.4) | 25.8 (1.0) | 13.7 | — | — | 1/6.1 | 60 | 1350 | 24 |
| 20 | 40.5 (4.5) | — | 20.0 (0.4) | 25.8 (1.0) | 13.7 | — | — | 1/6.1 | 60 | 1440 | 0.5 |
| 21 | 40.7 (18) | — | 28.1 (5.9) | 16.7 (5.9) | 14.5 | — | — | 1/3.1 | 60 | 1410 | 6 |
| 22 | — | 39.5 | 28.1 (0.2) | 17.9 (1.0) | 14.5 | — | — | 1/8.8 | 80 | 1410 | 6 |
| 23 | 39.1 (4.5) | — | — | — | 19.1 | 19.2 | 22.6 | — | 50 | 1410 | 6 |
| 24 | 39.3 (4.5) | — | 46.4 (5.9) | — | 14.3 | — | — | 1/0.8 | 50 | 1410 | 6 |
| 25 | 40.7 (5.0) | — | 28.1 (2.0) | 16.7 (1.0) | 14.5 | — | — | 1/3.1 | 65 | 1415 | 6 |

TABLE 2(a)-3

| | Batch composition (wt %) | | | | | | | Ratio of average particle size (kaoline/talc) | Firing | | |
|---|---|---|---|---|---|---|---|---|---|---|---|
| Test No. | Talc (average particle size μm) | Calcined talc | Kaoline (average particle size μm) | Calcined kaoline (average particle size μm) | Alumina | Aluminum hydroxide | Silica | | Temperature raising rate*[1] (°C./hr) | Maximum temperature (°C.) | Holding time (hr) |
| 26 | 40.7 (3.7) | — | 28.1 (2.0) | 16.7 (1.0) | 14.5 | — | — | 1/2.3 | 65 | 1415 | 6 |
| 27 | 40.7 (4.5) | — | 28.1 (2.0) | 16.7 (2.0) | 14.5 | — | — | 1/2.3 | 65 | 1415 | 6 |
| 28 | 40.7 (5.0) | — | 28.1 (0.2) | 16.7 (1.0) | 14.5 | — | — | 1/10 | 65 | 1410 | 8 |
| 29 | 40.7 (5.0) | — | 28.1 (1.0) | 16.7 (1.0) | 14.5 | — | — | 1/5.0 | 65 | 1410 | 8 |
| 30 | 40.7 (5.0) | — | 28.1 (0.2) | 16.7 (2.0) | 14.5 | — | — | 1/5.7 | 65 | 1410 | 8 |
| 31 | 40.7 (7.0) | — | 28.1 (0.2) | 16.7 (2.0) | 14.5 | — | — | 1/8.0 | 65 | 1425 | 10 |
| 32 | 40.7 (7.0) | — | 28.1 (2.0) | 16.7 (2.0) | 14.5 | — | — | 1/3.5 | 65 | 1425 | 10 |

*[1] Average temperature raising rate in a temperature range of 1100–1350° C.

TABLE 2(b)-1

| | Characteristic properties of sintered bodies | | | | | | |
|---|---|---|---|---|---|---|---|
| Test No. | CTE in axis A (× 10$^{-6}$/°C.) | CTE in axis B (× 10$^{-6}$/°C.) | Porosity (%)*[2] | Amount of cordierite crystal (wt %)*[3] | Compression strength in axis A (kg/cm$^2$)*[4] | Thermal shock resistance property (°C.)*[5] | Remarks |
| 1 | 0.4 | 0.9 | 31.0 | 95 | 188 | 750 | Reference |

TABLE 2(b)-1-continued

| Test No. | CTE in axis A (× 10⁻⁶/°C.) | CTE in axis B (× 10⁻⁶/°C.) | Porosity (%)*² | Amount of cordierite crystal (wt %)*³ | Compression strength in axis A (kg/cm²)*⁴ | Thermal shock resistance property (°C.)*⁵ | Remarks |
|---|---|---|---|---|---|---|---|
| 2 | 0.5 | 0.8 | 30.2 | 95 | 197 | 750 | |
| 3 | 0.5 | 0.6 | 29.8 | 94 | 201 | 900 | Present invention |
| 4 | 0.6 | 0.7 | 27.6 | 94 | 253 | 850 | |
| 5 | 0.7 | 0.8 | 26.5 | 94 | 261 | 800 | |
| 6 | 0.4 | 0.5 | 25.4 | 95 | 263 | 950 | |
| 7 | 0.6 | 0.6 | 24.9 | 95 | 295 | 850 | |
| 8 | 1.1 | 1.3 | 31.7 | 91 | 181 | 700 | Reference |
| 9 | 0.8 | 1.0 | 29.8 | 92 | 203 | 750 | Present invention |
| 10 | 0.7 | 0.8 | 27.3 | 93 | 243 | 800 | |
| 11 | 1.2 | 1.5 | 31.2 | 90 | 180 | 650 | Reference |
| 12 | 0.3 | 0.5 | 28.7 | 92 | 233 | 950 | Present invention |
| 13 | 0.5 | 0.6 | 28.7 | 95 | 230 | 900 | |

TABLE 2(b)-2

| Test No. | CTE in axis A (× 10⁻⁶/°C.) | CTE in axis B (× 10⁻⁶/°C.) | Porosity (%)*² | Amount of cordierite crystal (wt %)*³ | Compression strength in axis A (kg/cm²)*⁴ | Thermal shock resistance property (°C.)*⁵ | Remarks |
|---|---|---|---|---|---|---|---|
| 14 | 0.9 | 1.2 | 30.8 | 92 | 195 | 700 | Reference |
| 15 | 0.7 | 0.8 | 28.6 | 95 | 234 | 800 | Present invention |
| 16 | 0.7 | 0.7 | 26.3 | 93 | 272 | 800 | |
| 17 | 0.6 | 0.6 | 28.0 | 93 | 237 | 850 | |
| 18 | 0.4 | 0.5 | 28.3 | 93 | 234 | 950 | |
| 19 | 0.8 | 1.0 | 28.7 | 90 | 230 | 750 | |
| 20 | 0.5 | 0.7 | 25.8 | 91 | 239 | 850 | |
| 21 | 0.6 | 0.9 | 35.8 | 95 | 127 | 750 | Reference |
| 22 | 0.6 | 0.6 | 27.2 | 93 | 238 | 850 | Present invention |
| 23 | 1.1 | 1.4 | 37.4 | 91 | 107 | 650 | Reference |
| 24 | 1.0 | 1.3 | 32.9 | 94 | 145 | 700 | |
| 25 | 0.8 | 1.0 | 29.6 | 94 | 209 | 750 | Present invention |

TABLE 2(b)-3

| Test No. | CTE in axis A (× 10⁻⁶/°C.) | CTE in axis B (× 10⁻⁶/°C.) | Porosity (%)*² | Amount of cordierite crystal (wt %)*³ | Compression strength in axis A (kg/cm²)*⁴ | Thermal shock resistance property (°C.)*⁵ | Remarks |
|---|---|---|---|---|---|---|---|
| 26 | 1.0 | 1.2 | 28.7 | 94 | 232 | 700 | Reference |
| 27 | 0.9 | 1.1 | 29.4 | 94 | 217 | 700 | |
| 28 | 0.5 | 0.6 | 27.3 | 93 | 241 | 900 | Present invention |
| 29 | 0.7 | 0.8 | 27.9 | 95 | 240 | 800 | |
| 30 | 0.6 | 0.6 | 27.6 | 95 | 248 | 850 | |
| 31 | 0.5 | 0.7 | 28.9 | 96 | 223 | 850 | |
| 32 | 0.6 | 0.7 | 29.6 | 96 | 213 | 850 | |

*²Mercury porosimeter. Calculated on total pores volume (Assumed cordierite true density of 2.52)
*³X-ray diffraction. Quantitative values on ZnO internal standard
*⁴Measured on a specimen of 25.4 mm$\phi$ × 25.4 mml at a cross-head speed of 0.5 mm/min
*⁵Durable temperature when held for 30 min and exposing to room temperature

EXAMPLE 2

The batches of Nos. 6 and 21 of Table 2 are extruded respectively from dies of different cell structures in the same manner as in Example 1, and the green honeycomb structures are fired to produce cylindrical honeycomb structures of Nos. 41–47 of a diameter of 93 mm and a height of 100 mm and cell structures as shown in table 3. Thus produced honeycomb structures are evaluated on CTE in axis A in a temperature range of 40°–800° C., CTE in axis B in the same temperature range, and compression strength in axis A. The results of the evaluation are also shown in Table 3.

TABLE 3

| | Example (Table 2, No. 6) | | | | | Referential Example (Table 2, No. 21) | |
|---|---|---|---|---|---|---|---|
| No. | 41 | 42 | 43 | 44 | 45 | 46 | 47 |
| Cell shape | Square | | | | | Square | |
| Wall thickness (μm) | 203 | 152 | 127 | 102 | 102 | 152 | 102 |
| Cell density (cells/cm²) | 47 | 62 | 78 | 93 | 190 | 62 | 93 |
| CTE in axis A (× 10⁻⁶/°C., 40–800° C.) | 0.4 | 0.4 | 0.4 | 0.4 | 0.5 | 0.6 | 0.6 |
| CTE in axis B (× 10⁻⁶/°C., 40–800° C.) | 0.6 | 0.5 | 0.5 | 0.5 | 0.6 | 0.9 | 0.9 |
| Compression strength in axis A (kg/cm²) | 371 | 358 | 318 | 263 | 287 | 231 | 127 |

As clearly apparent from the above Tables 2 and 3, the cordierite honeycomb structures of the present invention exhibit exceedingly superior low expansion and strength as catalyst carriers.

EXAMPLE 3

Raw materials of characteristic properties as shown in the following Table 4 are used to prepare batches of Nos. 51-87 of Table 5 based on batch composition shown in Table 5. 100 parts by weight of the batch composition of the raw materials are added and kneaded with 3.8 parts by weight of methylcellulose and a suitable amount of water to form an extrudable blend. The raw materials were all preliminarily treated to pass a sieve of 63 μm. Then, each blend of the respective batch is formed into a cylindrical honeycomb structure of a diameter of 93 mm and a height of 100 mm having a square cell structure, a cell number of 93 per $cm^2$ and a partition wall thickness of 102 μm by a well known extrusion means. The honeycomb structures of respective batches are dried, and fired at firing conditions shown in Table 5 to sinter the same. The sintered bodies are evaluated on CTE in axis A in 40°–800° C., CTE is axis B in 40°–800° C., porosity, amount of cordierite crystals, compression strength in the direction of axis A, and thermal shock resistance. The results of the evaluation are also shown in Table 5. All the sintered bodies have chemical compositions of $P_2O_5$ content of less than 0.1%.

Particle size distributions and average particles diameter of the raw materials are measured in the same way as in Example 1.

TABLE 4(a)

|  | Average particles diameter (μm) | Ig. loss | $SiO_2$ | $Al_2O_3$ | MgO | $TiO_2$ | $Fe_2O_3$ | CaO + $Na_2O$ + $K_2O$ |
|---|---|---|---|---|---|---|---|---|
| Talc (C) | 7.0 | 5.6 | 61.3 | 0.9 | 30.9 | — | 0.9 | 0.3 |
| Talc (F) | 5.0 | 5.7 | 61.6 | 0.9 | 30.5 | — | 0.8 | 0.3 |
| Talc (D) | 4.5 | 5.7 | 60.8 | 1.3 | 30.8 | — | 1.0 | 0.3 |
| Talc (E) | 3.7 | 5.7 | 61.1 | 1.1 | 30.8 | — | 0.9 | 0.3 |
| Kaoline (C) | 1.0 | 13.9 | 45.5 | 38.6 | — | 1.0 | 0.4 | 0.2 |
| Kaoline (D) | 0.4 | 13.9 | 45.5 | 38.6 | — | 0.8 | 0.4 | 0.2 |
| Kaoline (E) | 0.2 | 13.9 | 45.2 | 37.9 | — | 1.4 | 0.8 | 0.2 |
| Calcined kaoline (B) | 2.0 | 0.1 | 53.1 | 45.1 | — | 0.8 | 0.4 | 0.2 |
| Calcined kaoline (A) | 1.0 | 0.1 | 53.1 | 45.0 | — | 0.9 | 0.4 | 0.2 |
| Calcined kaoline (D)*1 | 0.8 | 0.1 | 53.1 | 45.1 | — | 0.8 | 0.4 | 0.2 |

TABLE 4(b)

|  | Average particles diameter (μm) | Ig. loss | $SiO_2$ | $Al_2O_3$ | MgO | $TiO_2$ | $Fe_2O_3$ | CaO + $Na_2O$ + $K_2O$ |
|---|---|---|---|---|---|---|---|---|
| Alumina (B)*2 | 2.0 | 0.3 | — | 99.4 | — | — | — | 0.33 $Na_2O$ |
| Alumina (C)*3 | 1.7 | 0.2 | — | 99.6 | — | — | — | 0.12 $Na_2O$ |
| Alumina (D)*3 | 1.0 | 0.2 | — | 99.7 | — | — | — | 0.06 $Na_2O$ |
| Aluminum hydroxide (A) | 3.6 | 34.0 | — | 65.0 | — | — | — | 0.2 |
| Aluminum hydroxide (B) | 2.0 | 33.8 | — | 64.9 | — | — | — | 0.3 |
| Aluminum hydroxide (C) | 1.7 | 33.9 | — | 64.7 | — | — | — | 0.2 |
| Aluminum hydroxide (D) | 1.2 | 33.7 | — | 64.5 | — | — | — | 0.3 |
| Silica (A)*4 | 9.1 | 0.3 | 99.4 | 0.1 | — | — | — | — |
| Silica (B)*5 | 9.8 | 0.2 | 99.7 | 0.1 | — | — | — | — |

*1Prepared by firing kaoline (B) of TABLE 1 at 1000° C. for 4 hours, and grinding in a wet type ball mill
*2Alumina of ordinary sodium content ($Na_2O$ content of 0.33%)
*3Alumina of low sodium content ($Na_2O$ content of 0.12% or less)
*4Amorphous fused silica
*5Crystalline silica (quartz)

TABLE 5(a)-1

| Test No. | Batch composition (wt %) | | | | | | Ratio of average particle size (kaoline/talc) | Firing | | |
|---|---|---|---|---|---|---|---|---|---|---|
| | Talc (average particle size μm) | Kaoline (average particle size μm) | Calcined kaoline (average particle size μm) | Alumina (average particle size μm) | Aluminum hydroxide (average particle size μm) | Silica (average particle size μm) | | Temperature raising rate (°C./hr) | Maximum temperature (°C.) | Holding time (hr) |
| 51 | 40.7 (7.0) | 28.1 (1.0) | 16.7 (2.0) | 14.5 (2.0) | — | — | 1/5.1 | 60 | 1420 | 10 |
| 52 | 40.7 (5.0) | 28.1 (1.0) | 16.7 (2.0) | 14.5 (2.0) | — | — | 1/3.6 | 60 | 1420 | 10 |
| 53 | 40.7 (3.7) | 28.1 (0.2) | 16.7 (1.0) | 14.5 (2.0) | — | — | 1/7.4 | 60 | 1420 | 10 |
| 54 | 40.7 (3.7) | 28.1 (0.2) | 16.7 (0.8) | 14.5 (2.0) | — | — | 1/8.7 | 60 | 1420 | 10 |
| 55 | 40.7 (5.0) | 28.1 (1.0) | 16.7 (1.0) | 14.5 (1.7)*1 | — | — | 1/5.0 | 60 | 1420 | 10 |
| 56 | 40.7 (3.7) | 28.1 (0.4) | 16.7 (1.0) | 14.5 (1.7)*1 | — | — | 1/5.9 | 60 | 1420 | 10 |
| 57 | 40.7 (3.7) | 28.1 (0.2) | 16.7 (0.8) | 14.5 (1.7)*1 | — | — | 1/8.7 | 60 | 1420 | 10 |
| 58 | 40.7 (5.0) | 28.1 (1.0) | 16.7 (1.0) | 14.5 (1.0)*1 | — | — | 1/5.0 | 60 | 1420 | 10 |
| 59 | 40.7 (3.7) | 28.1 (0.2) | 16.7 (1.0) | 14.5 (1.0)*1 | — | — | 1/7.4 | 60 | 1420 | 10 |
| 60 | 40.7 (3.7) | 28.1 (0.2) | 16.7 (0.8) | 14.5 (1.0)*1 | — | — | 1/8.7 | 60 | 1420 | 10 |
| 61 | 41.0 (3.7) | 25.0 (0.2) | 20.5 (0.8) | 13.5 (1.7)*1 | — | — | 1/7.9 | 50 | 1420 | 12 |
| 62 | 41.0 (3.7) | 25.0 (0.2) | 20.5 (0.8) | 13.5 (1.0)*1 | — | — | 1/7.9 | 50 | 1420 | 12 |
| 63 | 39.1 (5.0) | 29.1 (1.0) | 16.0 (1.0) | 9.0 (2.0) | 6.8 (3.6) | — | 1/5.0 | 50 | 1420 | 8 |

TABLE 5(a)-2

| Test No. | Talc (average particle size μm) | Kaoline (average particle size μm) | Calcined kaoline (average particle size μm) | Alumina (average particle size μm) | Aluminum hydroxide (average particle size μm) | Silica (average particle size μm) | Ratio of average particle size (kaoline/talc) | Firing Temperature raising rate (°C./hr) | Firing Maximum temperature (°C.) | Holding time (hr) |
|---|---|---|---|---|---|---|---|---|---|---|
| 64 | 39.1 (5.0) | 29.1 (1.0) | 16.0 (1.0) | 9.0 (2.0) | 6.8 (2.0) | — | 1/5.0 | 50 | 1420 | 8 |
| 65 | 39.1 (3.7) | 29.1 (0.4) | 16.0 (0.8) | 9.0 (1.0)*1 | 6.8 (1.7) | — | 1/6.8 | 50 | 1420 | 8 |
| 66 | 37.2 (3.7) | 25.0 (1.0) | 18.4 (1.0) | — | 19.4 (3.6) | — | 1/3.7 | 50 | 1420 | 6 |
| 67 | 37.2 (5.0) | 25.0 (0.4) | 18.4 (1.0) | — | 19.4 (2.0) | — | 1/7.6 | 50 | 1420 | 6 |
| 71 | 39.0 (5.0) | 20.0 (1.0) | 15.0 (1.0) | 10.5 (2.0) | 10.5 (3.6) | 5.0 (9.1) | 1/5.0 | 60 | 1420 | 12 |
| 72 | 39.0 (4.5) | 20.0 (0.4) | 15.0 (2.0) | 10.5 (2.0) | 10.5 (2.0) | 5.0 (9.8)*2 | 1/6.8 | 60 | 1420 | 12 |
| 73 | 39.0 (7.0) | 20.0 (0.4) | 15.0 (2.0) | 10.5 (2.0) | 10.5 (2.0) | 5.0 (9.1) | 1/6.4 | 60 | 1420 | 12 |
| 74 | 39.0 (5.0) | 20.0 (1.0) | 15.0 (2.0) | 10.5 (2.0) | 10.5 (1.7) | 5.0 (9.1) | 1/3.5 | 60 | 1420 | 12 |
| 75 | 39.0 (4.5) | 20.0 (0.4) | 15.0 (1.0) | 10.5 (2.0) | 10.5 (2.0) | 5.0 (9.1) | 1/6.8 | 60 | 1420 | 12 |
| 76 | 39.0 (3.7) | 20.0 (0.2) | 15.0 (1.0) | 10.5 (2.0) | 10.5 (2.0) | 5.0 (9.1) | 1/6.8 | 60 | 1420 | 12 |
| 77 | 39.0 (3.7) | 20.0 (0.2) | 15.0 (0.8) | 10.5 (2.0) | 10.5 (1.2) | 5.0 (9.1) | 1/8.1 | 60 | 1420 | 12 |
| 78 | 39.0 (5.0) | 20.0 (1.0) | 15.0 (2.0) | 10.5 (1.7)*1 | 10.5 (1.7) | 5.0 (9.1) | 1/3.5 | 60 | 1420 | 12 |
| 79 | 39.0 (4.5) | 20.0 (0.4) | 15.0 (1.0) | 10.5 (1.7)*1 | 10.5 (2.0) | 5.0 (9.1) | 1/6.8 | 60 | 1420 | 12 |

TABLE 5(a)-3

| Test No. | Talc (average particle size μm) | Kaoline (average particle size μm) | Calcined kaoline (average particle size μm) | Alumina (average particle size μm) | Aluminum hydroxide (average particle size μm) | Silica (average particle size μm) | Ratio of average particle size (kaoline/talc) | Firing Temperature raising rate (°C./hr) | Firing Maximum temperature (°C.) | Holding time (hr) |
|---|---|---|---|---|---|---|---|---|---|---|
| 80 | 39.0 (3.7) | 20.0 (0.2) | 15.0 (0.8) | 10.5 (1.7)*1 | 10.5 (1.2) | 5.0 (9.1) | 1/8.1 | 60 | 1420 | 12 |
| 81 | 39.0 (5.0) | 20.0 (1.0) | 15.0 (2.0) | 10.5 (1.0)*1 | 10.5 (1.7) | 5.0 (9.1) | 1/3.5 | 60 | 1420 | 10 |
| 82 | 39.0 (4.5) | 20.0 (0.4) | 15.0 (1.0) | 10.5 (1.0)*1 | 10.5 (2.0) | 5.0 (9.1) | 1/6.8 | 60 | 1420 | 10 |
| 83 | 39.0 (3.7) | 20.0 (0.2) | 15.0 (0.8) | 10.5 (1.0)*1 | 10.5 (1.2) | 5.0 (9.1) | 1/8.1 | 60 | 1420 | 10 |
| 84 | 39.0 (4.5) | 15.0 (0.4) | 9.0 (2.0) | 10.5 (1.7)*1 | 16.5 (1.7) | 10.0 (9.1) | 1/4.5 | 70 | 1420 | 8 |
| 85 | 39.0 (4.5) | 17.0 (0.4) | 11.5 (2.0) | 10.5 (1.7)*1 | 14.0 (1.7) | 8.0 (9.1) | 1/4.3 | 70 | 1420 | 8 |
| 86 | 39.0 (4.5) | 20.0 (0.4) | 19.0 (2.0) | 10.5 (1.7)*1 | 8.5 (1.7) | 3.0 (9.1) | 1/3.8 | 70 | 1420 | 8 |
| 87 | 39.0 (4.5) | 23.5 (0.4) | 20.0 (2.0) | 10.5 (1.7)*1 | 6.0 (1.7) | 1.0 (9.1) | 1/4.0 | 70 | 1420 | 8 |

*1 Alumina of low sodium content.
*2 Crystalline silica.

TABLE 5(b)-1

| Test No. | CTE in axis A ($\times 10^{-6}$/°C.) | CTE in axis B ($\times 10^{-6}$/°C.) | Porosity (%) | Amount of cordierite crystal (wt %) | Compression strength in axis A (kg/cm$^2$) | Thermal shock resistance property (°C.) | Remarks |
|---|---|---|---|---|---|---|---|
| 51 | 0.6 | 0.7 | 25.0 | 93 | 307 | 850 | Present invention |
| 52 | 0.7 | 0.8 | 24.7 | 93 | 330 | 800 | |
| 53 | 0.6 | 0.8 | 23.0 | 95 | 389 | 850 | |
| 54 | 0.8 | 0.9 | 19.8 | 92 | 445 | 800 | |
| 55 | 0.7 | 0.8 | 22.7 | 91 | 396 | 800 | |
| 56 | 0.7 | 0.9 | 20.3 | 92 | 441 | 800 | |
| 57 | 0.8 | 0.8 | 18.8 | 94 | 485 | 850 | |
| 58 | 0.8 | 1.0 | 22.0 | 93 | 403 | 750 | |
| 59 | 0.6 | 0.8 | 20.3 | 94 | 432 | 900 | |
| 60 | 0.7 | 0.7 | 18.0 | 92 | 523 | 850 | |
| 61 | 0.7 | 0.7 | 20.9 | 93 | 430 | 850 | |
| 62 | 0.6 | 0.6 | 19.3 | 94 | 474 | 900 | |
| 63 | 0.8 | 1.0 | 26.7 | 95 | 272 | 750 | Reference |

TABLE 5(b)-2

| Test No. | CTE in axis A ($\times 10^{-6}$/°C.) | CTE in axis B ($\times 10^{-6}$/°C.) | Porosity (%) | Amount of cordierite crystal (wt %) | Compression strength in axis A (kg/cm$^2$) | Thermal shock resistance property (°C.) | Remarks |
|---|---|---|---|---|---|---|---|
| 64 | 0.7 | 0.8 | 23.0 | 96 | 395 | 800 | Present invention |
| 65 | 0.6 | 0.7 | 20.8 | 94 | 425 | 900 | |
| 66 | 0.7 | 0.9 | 27.4 | 95 | 250 | 750 | Reference |
| 67 | 0.6 | 0.8 | 22.9 | 96 | 400 | 850 | Present invention |
| 71 | 0.8 | 1.0 | 28.9 | 93 | 235 | 750 | Reference |
| 72 | 0.6 | 0.8 | 28.9 | 92 | 230 | 850 | Present invention |
| 73 | 0.3 | 0.6 | 30.0 | 90 | 200 | 900 | |
| 74 | 0.3 | 0.5 | 27.8 | 92 | 240 | 950 | |
| 75 | 0.4 | 0.7 | 25.0 | 91 | 303 | 900 | |
| 76 | 0.4 | 0.7 | 24.6 | 91 | 321 | 900 | |
| 77 | 0.5 | 0.7 | 24.3 | 91 | 338 | 850 | |

TABLE 5(b)-2-continued

| | Characteristic properties of sintered bodies | | | | | | |
|---|---|---|---|---|---|---|---|
| Test No. | CTE in axis A (× 10$^{-6}$/°C.) | CTE in axis B (× 10$^{-6}$/°C.) | Porosity (%) | Amount of cordierite crystal (wt %) | Compression strength in axis A (kg/cm$^2$) | Thermal shock resistance property (°C.) | Remarks |
| 78 | 0.3 | 0.6 | 27.0 | 91 | 245 | 950 | |
| 79 | 0.4 | 0.7 | 24.7 | 90 | 325 | 900 | |

TABLE 5(b)-3

| | Characteristic properties of sintered bodies | | | | | | |
|---|---|---|---|---|---|---|---|
| Test No. | CTE in axis A (× 10$^{-6}$/°C.) | CTE in axis B (× 10$^{-6}$/°C.) | Porosity (%) | Amount of cordierite crystal (wt %) | Compression strength in axis A (kg/cm$^2$) | Thermal shock resistance property (°C.) | Remarks |
| 80 | 0.5 | 0.7 | 23.0 | 94 | 392 | 850 | Present invention |
| 81 | 0.4 | 0.6 | 25.9 | 91 | 280 | 900 | |
| 82 | 0.5 | 0.8 | 24.3 | 92 | 358 | 850 | |
| 83 | 0.6 | 0.8 | 22.7 | 91 | 401 | 800 | |
| 84 | 0.3 | 0.6 | 32.4 | 92 | 167 | 950 | Reference |
| 85 | 0.3 | 0.6 | 29.0 | 92 | 236 | 950 | Present invention |
| 86 | 0.5 | 0.7 | 25.7 | 90 | 277 | 850 | |
| 87 | 0.5 | 0.7 | 25.1 | 91 | 296 | 850 | |

As seen from Table 5, test Nos. 51–62, 64, 65 and 67 wherein fine talc and kaoline are admixtured with alumina and/or aluminum hydroxide of an average particles diameter of 2 μm or less, and test Nos. 71, 73–87 wherein highly pure amorphous silica is added in an amount of not over than 8%, achieve smaller porosities and lower CTE than Example 1 wherein relatively coarse alumina particles of an average particles diameter of 4 μm are used.

Referential Examples of test Nos. 63, 66 and 71 used aluminum hydroxide of a particle size of 3.6 μm larger than 2.0 μm, and test No. 72 used crystalline silica as a silica source material, so that their porosities are higher than other test Nos. in Table 5. However, these porosities are substantially equal to the porosities of the present honeycomb structures, so that they fall within the scope of the present invention. Referential Example of test No. 84 has a silica content of 10% which is larger than silica content of 8%, so that its porosity is widely increased.

EXAMPLE 4

Batches of test Nos. 60 (porosity 18.0%), 56 (porosity 20.3%), 53 (porosity 23.0%), 51 (porosity 25.0%), 78 (porosity 27.0%) and 73 (porosity 30.0%) are respectively formed into honeycomb structures by extrusion from dies of different cell structures in the same manner as in Example 3, and the extrudates are dried and fired to produce cylindrical honeycomb structures of diameter of 93 mm and a height of 100 mm having cell structures as shown in the following Table 6. Respective honeycomb structures are measured on compression strength in axis A. From the measurements, points corresponding to compression strength in axis A of 200±10 kg/cm$^2$ are plotted, and interrelations between porosity, partition wall thickness and cell number per unit area, are shown in the attached FIG. 4.

TABLE 6

| Wall thickness (μm) | Cell number (/cm$^2$) | | | | | | | | |
|---|---|---|---|---|---|---|---|---|---|
| | 140 | 109 | 93 | 62 | 47 | 31 | 16 | 8 | 3 |
| 76 | ○ | ○ | ○ | ○ | — | — | — | — | — |
| 102 | ○ | ○ | ○ | ○ | ○ | — | — | — | — |
| 127 | — | ○ | ○ | ○ | ○ | ○ | — | — | — |
| 152 | — | — | ○ | ○ | ○ | ○ | — | — | — |

TABLE 6-continued

| Wall thickness (μm) | Cell number (/cm$^2$) | | | | | | | | |
|---|---|---|---|---|---|---|---|---|---|
| | 140 | 109 | 93 | 62 | 47 | 31 | 16 | 8 | 3 |
| 178 | — | — | ○ | ○ | ○ | ○ | ○ | — | — |
| 203 | — | — | ○ | ○ | ○ | ○ | ○ | — | — |
| 254 | — | — | — | ○ | ○ | ○ | ○ | ○ | — |
| 305 | — | — | — | ○ | ○ | ○ | ○ | ○ | — |
| 381 | — | — | — | — | ○ | ○ | ○ | ○ | ○ |
| 437 | — | — | — | — | ○ | ○ | ○ | ○ | ○ |

Figure 1:
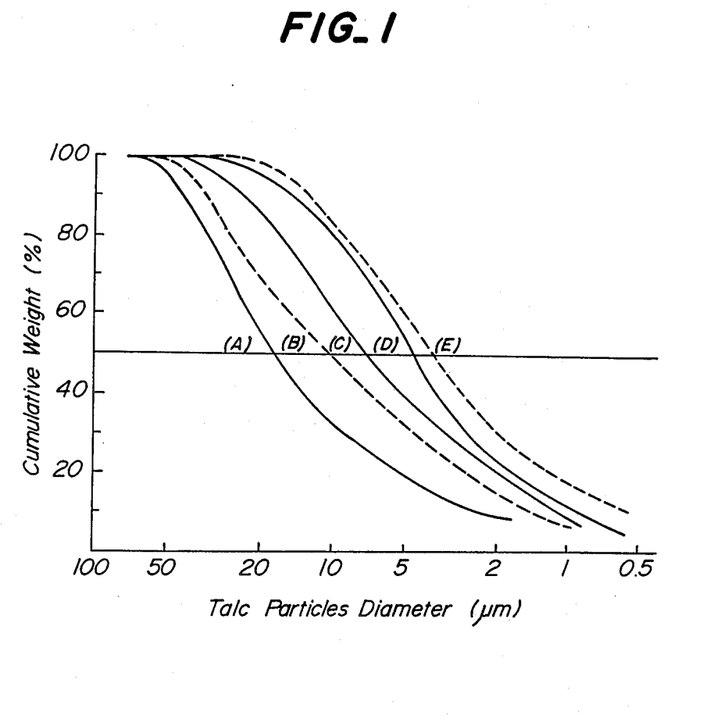
FIG. 1 is a graph showing particle size distributions of a fine talc used in the method of the present invention.
Figure 2:
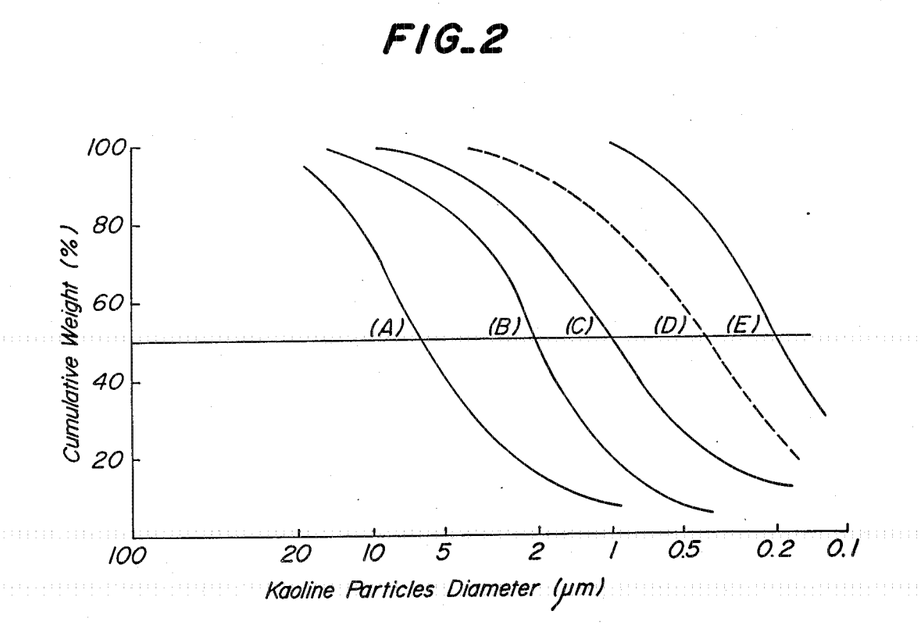
FIG. 2 is a graph showing particle size distribution of a fine kaoline used in the method of the present invention.
Figure 3:
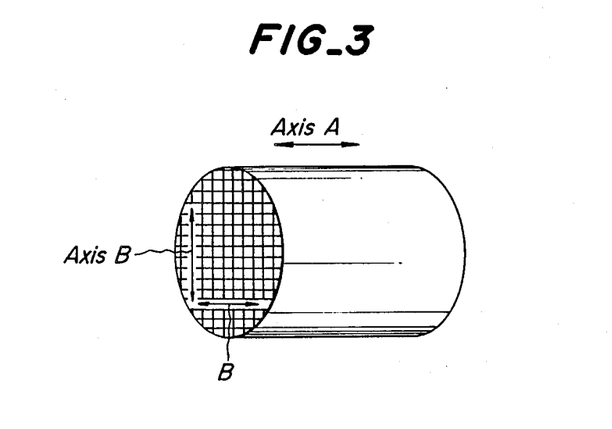
FIG. 3 is a schematic perspective view showing a honeycomb structure of the present invention.
Figure 4:
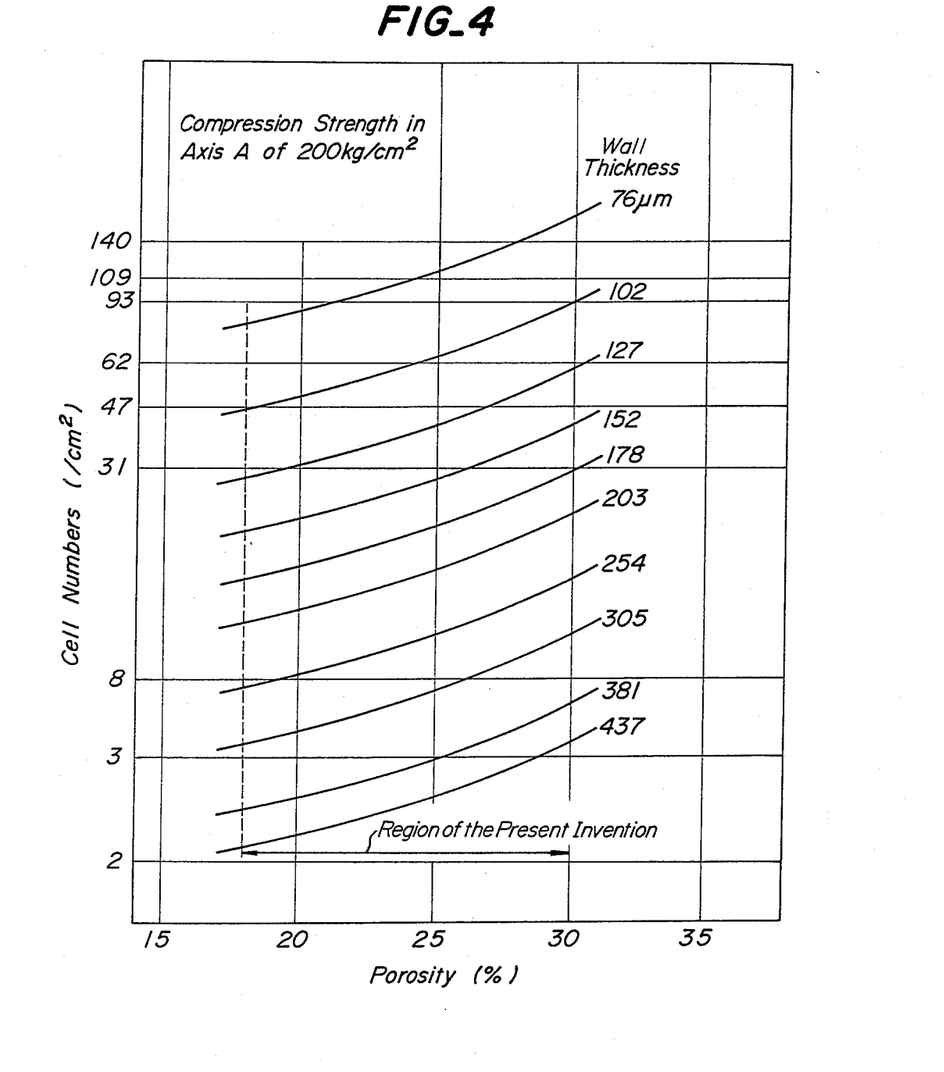
FIG. 4 is a graph showing relations between porosity, partition wall thickness and cell number of the honeycomb structures of the present invention.

From Table 6 and FIG. 4, it becomes clear that, when calculated a partition wall thickness at the time of the compression strength in axis A of the honeycomb structure of 200 kg/cm$^2$ from the porosities which are included in the scope of the present invention, the partition wall thickness can be defined as 437 μm or less in a range of cell density of 2–140 cells/cm$^2$.

As described in detail in the foregoings, the present invention can provide honeycomb structures of low expansion, porosities of 30% or less, high strengths and thin partition walls with high or low cell densities. These honeycomb structures can be used advantageously in a broader range as catalyst carriers of honeycomb structures, particularly catalyst carriers for purifying exhaust gases from automobile engines. Thus, the present invention is eminently useful industrially.

Although the present invention has been described with reference to specific examples and numerical values, it should be understood that the present invention is not restricted to such examples and numerical values, and numerous changes and modifications are possible without departing from the broad spirit and the aspect of the present invention as defined in the appended claims.

What is claimed is:

1. A method of producing a cordierite catalyst carrier having a honeycomb structure comprising:
    preparing a batch including talc particles having an average particle diameter of not greater than 7 μm, kaolin particles having an average particle diameter not greater than 2 μm and not greater than $\frac{1}{3}$ of the average particle diameter of the talc particles and other raw materials for producing the cordierite;

adding an organic binder and a plasticizer to the batch to form an admixture;

kneading said admixture to plasticize same to an extrudable consistency;

extruding said admixture to form a honeycomb structure;

drying the extruded honeycomb structure; and firing the honeycomb structure at a temperature of 1350°–1440° C.

2. The method of claim 1, wherein said talc particles have an average particle diameter of not greater than 5 μm.

3. The method of claim 1, wherein said kaolin particles have an average particle diameter of not greater than 1 μm.

4. The method of claim 1, wherein at least one material selected from the group consisting of alumina particles and aluminum hydroxide particles having an average particle diameter not greater than 2 μm is added to the batch.

5. The method of claim 4, wherein said talc particles have an average particle diameter of not greater than 5 μm.

6. The method of claim 4, wherein said kaolin particles have an average particle diameter of not greater than 1 μm.

7. The method of claim 4, wherein said alumina has a $Na_2O$ content not exceeding 0.12%.

8. The method of claim 4, wherein said kaolin particles are prepared by grinding calcined kaoline in a wet type ball mill.

9. The method of claim 1, wherein highly pure amorphous silica is added to the batch.

10. The method of claim 9, wherein said talc particles have an average particle diameter of not greater than 5 μm.

11. The method of claim 9, wherein said kaolin particles have an average particle diameter of not greater than 1 μm.

12. The method of claim 9, wherein said alumina has a $Na_2O$ content not exceeding 0.12%.

13. The method of claim 9, wherein said kaolin particles are prepared by grinding calcined kaoline in a wet type ball mill.

14. The method of claim 9, wherein said highly pure amorphous silica is added to the batch in an amount not exceeding 8%.

15. A cordierite catalyst carrier having a honeycomb structure comprising:

a chemical composition in weight percent of 42–56% of $SiO_2$, 30–45% of $Al_2O_3$ and 12–16% of MgO as main components;

a crystalline phase consisting mainly of cordierite;

a porosity of not greater than 30%;

an axis A which corresponds to a longitudinal direction of a plurality of channels in said honeycomb structure, wherein the coefficient of thermal expansion in the direction of axis A is not greater than $0.8 \times 10^{-6}$/°C. in a temperature range of 40°–800° C.; and an axis B which corresponds to a transverse direction of said channels, wherein the coefficient of thermal expansion in the direction of axis B is not greater than $1.0 \times 10^{-6}$/°C. in a temperature range of 40°–800° C.

16. The structure of claim 15, which further comprises a porosity of not greater than 25%.

17. The structure of claim 15, which further comprises a difference between the coefficient of thermal expansion in the direction of axis A and the coefficient of thermal expansion in the direction of axis B which is not greater than $0.2 \times 10^{-6}$/°C. in a temperature range of 40°–800° C.

18. The structure of claim 13, which further comprises a compressive strength in the direction of axis A of not less than 200 kg/cm².

19. The structure of claim 15, which further comprises a partition wall thickness of not greater than 437 μm.

* * * * *